UNITED STATES PATENT OFFICE.

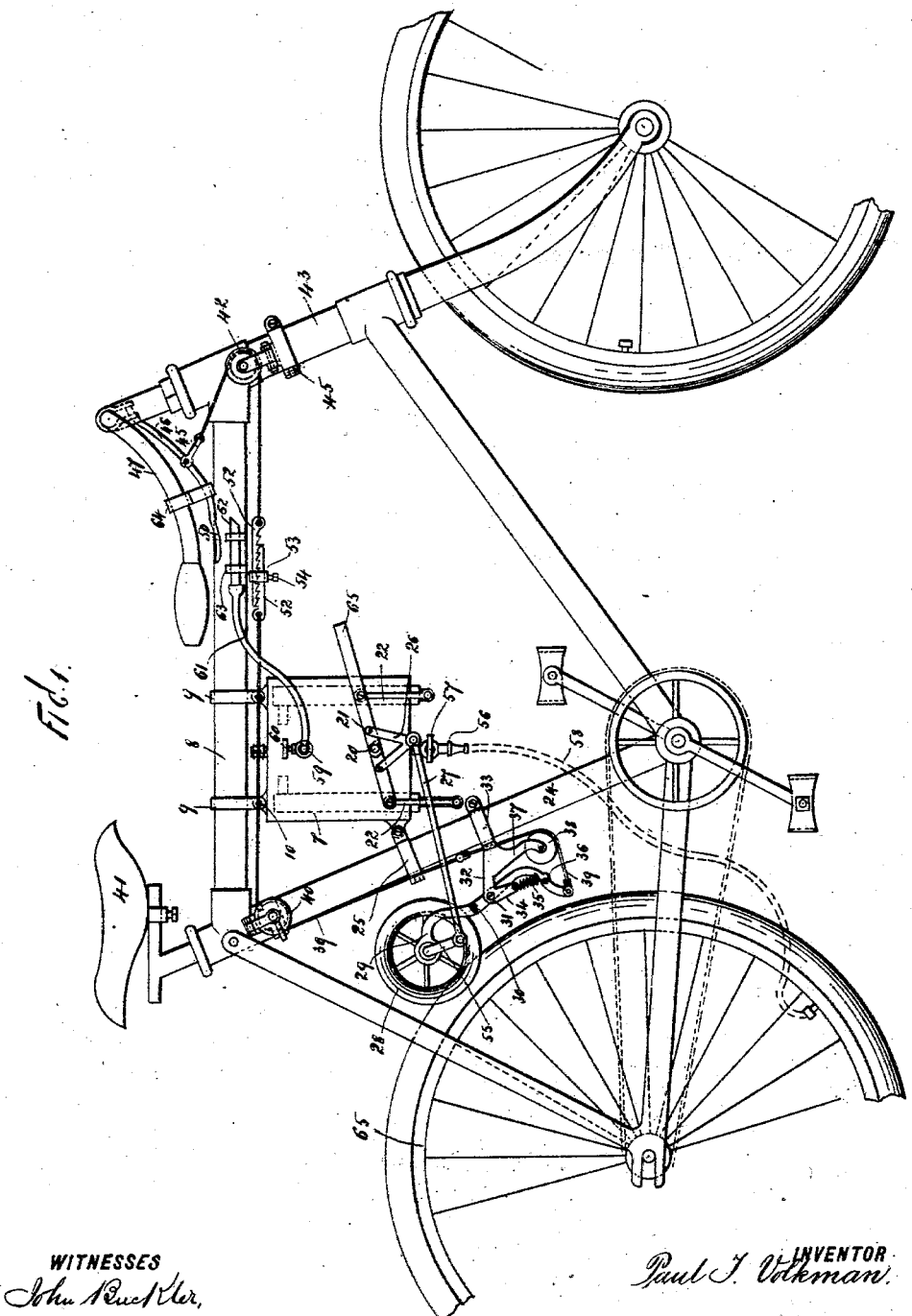

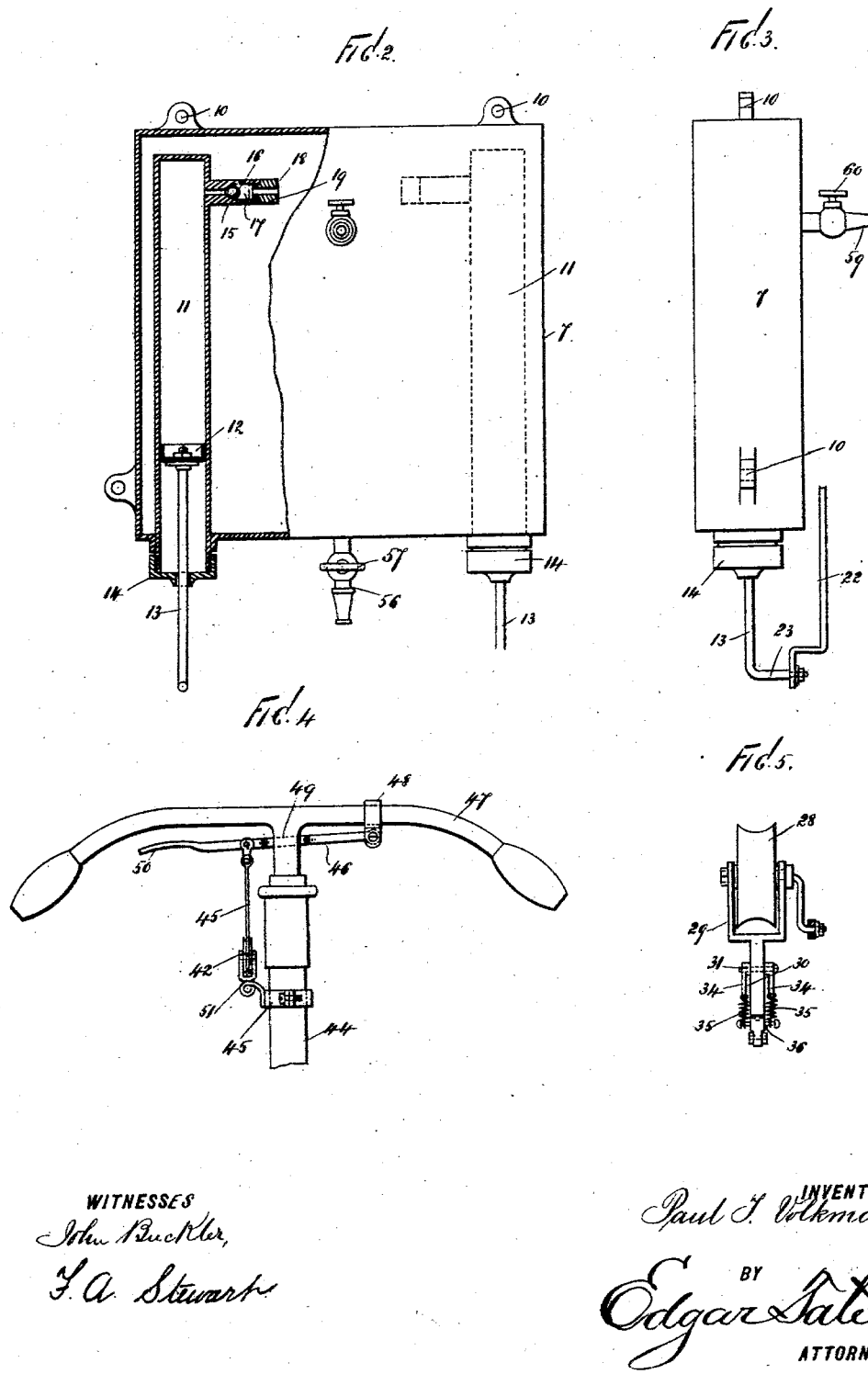

PAUL T. VOLKMAN, OF JERSEY CITY, NEW JERSEY.

BICYCLE-BRAKE.

SPECIFICATION forming part of Letters Patent No. 634,046, dated October 3, 1899.

Application filed November 14, 1898. Serial No. 696,344. (No model.)

*To all whom it may concern:*

Be it known that I, PAUL T. VOLKMAN, a citizen of the United States, residing at Jersey City, in the county of Hudson and State of New Jersey, have invented certain new and useful Improvements in Attachments for Bicycles and Similar Vehicles, of which the following is a full and complete specification, such as will enable those skilled in the art to which it appertains to make and use the same.

This invention relates to bicycles and similar vehicles; and the object thereof is to provide a vehicle of this class with an improved brake and means for operating the same, also an air-pump for inflating the tires of the vehicle, said pump being adapted to be operated both by a brake and by hand, said pump being provided with and adapted to operate a whistle; and with these and other objects in view the invention consists in the construction, combination, and arrangement of parts hereinafter described and claimed.

The invention is fully disclosed in the following specification, of which the accompanying drawings form a part, in which—

Figure 1 is a side view of an ordinary bicycle provided with my improvement; Fig. 2, a side view of the air-pump which I employ, part of the construction being shown in section; Fig. 3, a rear view of said pump; Fig. 4, a front view of the handle-bar and its attachments, and Fig. 5 a detail view of the brake.

In the drawings forming part of this specification the separate parts of my improvement are designated by the same numerals of reference in each of the views, and in said drawings I have shown my invention applied to a bicycle provided with what is known as a "diamond" frame, and in the practice of my invention I provide an air-pump which preferably comprises a casing 7, which is suspended from the top horizontal rod 8 of the frame of the vehicle by clamps or bands 9, which are connected with lugs or projections 10, formed on or secured to the casing 7.

The casing 7 is provided with two tubular pump-cylinders 11, which are arranged in the opposite sides of said casing, and the ends of which project downwardly through the bottom of said casing, and each of said pump-cylinders is provided with a piston 12, having a piston-rod 13, which passes downwardly through a detachable cap 14, which constitutes the bottom of the said pump-cylinders. Each of the pump-cylinders 11 is also provided at or near its upper end with a tubular discharge-pipe 15, in which is placed an automatic air-valve 16. The valves 16 are placed in chambers 17, which are closed by plugs 18, having ports or passages 19, and by the operation of the pistons 12, as hereinafter described, air is compressed in the casing 7.

Pivotally connected with one side of the casing 7 at 20 is a lever 21, which is adapted to oscillate in a vertical plane, and said lever is provided on opposite sides of its pivotal support with crank-arms 22, which are pivotally connected with the lower ends of the piston-rods 13, said piston-rods being provided with lateral projections 23 for this purpose.

In order to hold the pump-casing 7 stationary, I also connect the lower end thereof with the rod 24 of the frame of the vehicle, which extends from the support of the pedal-shaft upwardly to the seat-support, by means of a clamp or band 25, and the lever 21 is provided centrally with a triangular crank 26, with which is connected a crank-rod 27.

I also provide a brake-wheel 28, which is mounted in a yoke 29, having a downwardly and backwardly curved arm 30, which is pivotally connected at 31 with a support 32, which is rigidly connected with the rod 24 at 33, and said support is provided with downwardly-directed projections 34, with which are connected two springs 35, which are also connected with the lower portion of the arm 30 of the yoke which supports the brake-wheel 28, as shown at 36. The support 32 is also provided with downwardly-directed arms 37, in the lower ends of which is mounted a pulley or wheel 38, and connected with the lower end of the arm 30 is a strap, cord, belt, or band 39, which is passed forwardly around said wheel or pulley and carried upwardly and passed around a wheel or pulley 40, connected with the frame of the vehicle below the seat 41, and said strap, cord, belt, or band is carried forwardly beneath the horizontal top rod 8 of the frame and passed below and around another pulley 42, connected with the forward tubular head 43 of the frame of the vehicle by a clamp or band 44, and the ends of said strap, cord, belt, or band are connected at 45 with a lever 46, pivotally connected with one side of the handle-bar 47 by means of a clamp or band 48, and the lever 46 is carried transversely of the stem 49 of the handle-bar and is provided with a handle 50, which projects beneath the side of the handle-bar opposite that side with which said lever is connected, as clearly shown in Figs. 1 and 4.

The wheel or pulley 42 is connected with the clamp or band 45 by a yoke-shaped support 51, which is pivotally connected with said clamp or band, and the strap, cord, belt, or band 39 is composed of two parts, which are detachable and adjustably connected by means of interlocking rack-bars 52, which are passed through a keeper 53, provided with a set-screw 54. Any suitable connecting devices, however, may be substituted for the rack-bars 52, the only object in this connection being to provide means whereby the length of the strap, cord, belt, or band 39 may be adjusted so as to take up the slack thereof or regulate its operation.

The brake-wheel 38 is provided with a crank-arm 55, with which the crank-rod 27, which operates the pump-lever 21, is connected.

The lower end of the pump-casing 7 is also provided with a tubular nozzle 56, having a valve 57, and the nozzle 56 is designed to afford an attachment for a flexible tube 58, which may be connected therewith, whenever desired, for the purpose of inflating the tires of the wheels of the vehicle, and I also preferably provide the pump-casing 7 with a supplemental nozzle 59, having a valve 60, and a flexible tube 61 is connected with the nozzle 59 and designed to operate a whistle 62, which may be connected therewith and which may also be supported in keepers 63, secured to the upper horizontal rod 8 of the frame.

The pistons 12 operate in the manner of ordinary devices of this class for the purpose of compressing air in the casing 7, and the operation of the device will be readily understood from the foregoing description when taken in connection with the accompanying drawings and the following statement thereof.

The free end of the brake-lever 46 is passed through a keeper 64, suspended from the handle-bar, and in order to apply the brake-wheel 28 to the drive-wheel 65 of the vehicle adjacent to which it is mounted all that is necessary is to grasp the handle 50 of the brake-lever and pull it upwardly. This operation will throw the brake-wheel 28 backwardly and force it into contact with the tire of the drive-wheel of the vehicle. It will be understood, of course, that the brake-wheel 28 will revolve when thus brought in contact with the tire of the drive-wheel, and this movement of said brake-wheel will operate the crank-rod 27 and the lever 21 of the pump, and the pump-pistons 12 will be operated by said pump-lever and air will be compressed in the casing 7. By opening the valve 60 in the nozzle 59 an alarm may be given by the whistle 62 at any time, and the pump-lever 21 is provided with an extension 65, which serves as a handle, and by operating said lever by hand the air may be compressed to any desired extent in the casing 7, and the flexible tube 58 may be used to make connection with the air-nozzles of the tires of either of the wheels, and said tires may thus be inflated, as will be readily understood.

The connection of the brake-wheel 28 with the pump-lever serves to retard the revolution of said wheel, as said wheel is compelled to operate the pump mechanism, as will be readily understood, and said wheel is thus caused to also operate as an effective brake at the same time that it stores the air in the casing 7 for the purpose of operating the whistle 62 and for inflating the tires of the wheels of the vehicle. The springs 35 operate normally to throw the brake-wheel out of contact with the tire of the drive-wheel of the vehicle, and in order to operate said brake-wheel the brake-lever 46 must be manipulated as hereinbefore described.

My improvement is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A bicycle or similar vehicle provided with a pump-casing having two pump-cylinders, a pump-lever pivotally connected with said casing and adapted to operate said pump-cylinders, a spring-operated brake-wheel pivotally supported adjacent to one of the wheels of the vehicle, said brake-wheel being in operative connection with said pump-lever, and means for throwing said brake-wheel into contact with said wheel of the vehicle, substantially as shown and described.

2. A bicycle or similar vehicle, provided with a pump-casing having two pump-cylinders communicating therewith, said pump-casing surrounding said pump-cylinders and forming a compressed-air receiver, pistons and piston-rods operatively mounted in said cylinders, a lever pivotally connected with said pump-casing and pivotally connected with said piston-rods, devices connected with said casing and adapted to be connected with a whistle or tire, a wheel mounted in connection with the frame of said bicycle and provided with a crank, an angular crank-rod secured to said lever, and a crank-rod which pivotally engages said crank and said angular crank, substantially as shown and described.

3. A bicycle or similar vehicle, provided with a pump-casing having two pump-cylinders communicating therewith, said pump-casing surrounding said pump-cylinder and forming a compressed-air reservoir therefor, pistons and piston-rods operatively mounted in said cylinders, a lever pivotally secured to said pump-casing and pivotally connected with said piston-rods and devices secured to said casing and communicating with said reservoir and adapted to be connected with a whistle or tire, substantially as shown and described.

4. The herein-described brake, air-pump, and air-reservoir apparatus, which comprises a pump-casing adapted to be secured to the frame of a bicycle, and provided with two pump-cylinders, pistons and piston-rods operatively mounted in said cylinders, a lever pivotally secured to said casing, and pivotally connected with said piston-rods, a support adapted to be secured to the frame of a bicycle adjacent to one of the wheels thereof, a supplemental yoke-shaped support pivotally connected with said support, a brake-wheel revolubly mounted in said yoke-shaped support and provided with a crank, a crank-rod pivotally secured to said crank and operatively connected with said lever, and devices for causing said brake-wheel to engage, the adjacent wheel of the bicycle to operate said pump-pistons and to brake said wheel of the bicycle, substantially as shown and described.

5. The herein-described device for supplying air to a whistle or tire-inflating device, and adapted to be secured to a bicycle or similar vehicle, comprising a pump-casing provided with two pump-cylinders communicating therewith, said pump-casing surrounding said pump-cylinders and forming a compressed-air receiver therefor, pistons and piston-rods operatively mounted in said pump-cylinders, a lever pivotally connected with said pump-casing and with said piston-rods, a wheel pivotally mounted in connection with the frame of said bicycle and adjacent to one of the wheels of the bicycle, and devices for throwing said pivotally-mounted wheel into contact with the adjacent wheel of the bicycle, said pivotally-mounted wheel being in operative connection with said lever, substantially as shown and described.

In testimony that I claim the foregoing as my invention I have signed my name, in presence of the subscribing witnesses, this 7th day of November, 1898.

PAUL T. VOLKMAN.

Witnesses:
F. A. STEWART,
C. C. OLSEN.